US012591350B2

(12) United States Patent
Saha et al.

(10) Patent No.: US 12,591,350 B2
(45) Date of Patent: Mar. 31, 2026

(54) TECHNIQUES FOR POSITIONING SPEAKERS WITHIN A VENUE

(71) Applicant: HARMAN INTERNATIONAL INDUSTRIES, INCORPORATED, Stamford, CT (US)

(72) Inventors: Sambuddha Saha, Burdwan (IN); Vipul Sharma, Bengaluru (IN); George Georgallis, Los Angeles, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 647 days.

(21) Appl. No.: 17/307,407

(22) Filed: May 4, 2021

(65) Prior Publication Data
US 2022/0357834 A1     Nov. 10, 2022

(51) Int. Cl.
| | |
|---|---|
| *G06F 3/04815* | (2022.01) |
| *G06F 3/16* | (2006.01) |
| *G06T 17/00* | (2006.01) |
| *H04R 5/02* | (2006.01) |

(52) U.S. Cl.
CPC .......... *G06F 3/04815* (2013.01); *G06F 3/162* (2013.01); *G06T 17/00* (2013.01); *H04R 5/02* (2013.01); *G06T 2200/08* (2013.01)

(58) Field of Classification Search
CPC ..... G06F 3/04815; G06F 3/162; G06T 17/00; G06T 2200/08; H04R 5/02; H04R 27/00; H04R 2205/024
See application file for complete search history.

(56) References Cited

U.S. PATENT DOCUMENTS

| | | | | |
|---|---|---|---|---|
| 9,239,992 | B2 * | 1/2016 | Valentino | G06Q 30/0641 |
| 9,843,881 | B1 * | 12/2017 | Oates, III | H04R 5/02 |
| 10,223,740 | B1 * | 3/2019 | Gore | G06F 3/04842 |
| 10,645,275 | B1 * | 5/2020 | Chuah | H04N 23/64 |
| 10,827,322 | B1 * | 11/2020 | Lal | H04W 4/024 |
| 11,265,668 | B1 * | 3/2022 | Patil | G06N 3/0464 |
| 2003/0123692 | A1 * | 7/2003 | Ueki | H04R 1/44 381/396 |
| 2009/0003613 | A1 * | 1/2009 | Christensen | H04S 7/301 381/58 |
| 2009/0316938 | A1 * | 12/2009 | Matsumoto | H04R 3/12 381/300 |
| 2012/0027226 | A1 * | 2/2012 | Desenberg | H04N 7/15 381/387 |

(Continued)

OTHER PUBLICATIONS

"JBL Line Array Calculator 3.2.0 Now Available", https://www.jpro.co.nz/news-article/jbl-line-array-calculator-320-now-available-1020, 5 pages.

(Continued)

*Primary Examiner* — Solomon G Bezuayehu
(74) *Attorney, Agent, or Firm* — Artegis Law Group, LLP

(57) ABSTRACT

Various embodiments set forth techniques for positioning speakers within a venue. The techniques include generating, via a machine learning model, at least one of a two-dimensional (2D) representation or a three-dimensional (3D) representation of a venue based on one or more images of the venue. The techniques further include determining one or more parameters associated with one or more speakers to be placed within the venue based on the at least one of the 2D representation or the 3D representation.

23 Claims, 8 Drawing Sheets

(56) References Cited

U.S. PATENT DOCUMENTS

| | | | | |
|---|---|---|---|---|
| 2012/0051568 | A1* | 3/2012 | Kim | H04R 3/12 381/307 |
| 2012/0117502 | A1* | 5/2012 | Nguyen | G06F 3/0482 715/769 |
| 2013/0039515 | A1* | 2/2013 | Jin | H04R 7/02 381/407 |
| 2013/0222393 | A1* | 8/2013 | Merrell | G06T 11/00 345/441 |
| 2014/0133683 | A1* | 5/2014 | Robinson | H04R 5/04 381/303 |
| 2014/0168477 | A1* | 6/2014 | David | G06Q 30/0621 348/441 |
| 2014/0314256 | A1* | 10/2014 | Fincham | H04R 3/12 381/303 |
| 2014/0329567 | A1* | 11/2014 | Chan | H04M 1/605 455/569.1 |
| 2016/0026737 | A1* | 1/2016 | Feistel | G06F 30/00 703/1 |
| 2016/0247364 | A1* | 8/2016 | Herman | G08B 21/182 |
| 2016/0301373 | A1* | 10/2016 | Herman | H04W 4/80 |
| 2017/0073988 | A1* | 3/2017 | Sallent Puigcercos | E04H 3/22 |
| 2017/0099557 | A1* | 4/2017 | Saunders | H04S 7/305 |
| 2017/0182406 | A1* | 6/2017 | Castiglia | A63F 13/213 |
| 2018/0115825 | A1* | 4/2018 | Milne | H04R 3/12 |
| 2018/0137215 | A1* | 5/2018 | Lee | G06Q 30/30 |
| 2018/0197551 | A1* | 7/2018 | Mcdowell | H04S 7/30 |
| 2018/0374276 | A1* | 12/2018 | Powers | G06T 17/205 |
| 2019/0164340 | A1* | 5/2019 | Pejic | G06T 19/20 |
| 2019/0208314 | A1* | 7/2019 | Sakagushi | H04R 3/12 |
| 2019/0385373 | A1* | 12/2019 | Mittleman | G08B 29/18 |
| 2020/0281521 | A1* | 9/2020 | Cail | A61B 5/02055 |
| 2020/0302681 | A1* | 9/2020 | Totty | G06T 7/74 |
| 2021/0019453 | A1* | 1/2021 | Yang | G06F 30/13 |
| 2021/0073449 | A1* | 3/2021 | Segev | G06F 30/27 |
| 2021/0250669 | A1* | 8/2021 | Andrews | F16M 11/18 |
| 2021/0334535 | A1* | 10/2021 | Perciful | G06Q 30/0641 |
| 2021/0398353 | A1* | 12/2021 | Luo | G06T 7/11 |
| 2022/0108383 | A1* | 4/2022 | Kunikyo | G06Q 30/06 |
| 2022/0129974 | A1* | 4/2022 | Delgado | G06V 20/64 |
| 2022/0147563 | A1* | 5/2022 | Perumalla | H04S 7/40 |
| 2022/0224833 | A1* | 7/2022 | Cier | H04N 23/53 |
| 2022/0269888 | A1* | 8/2022 | Stoeva | G06V 10/255 |
| 2022/0327608 | A1* | 10/2022 | Assouline | G06V 10/751 |
| 2023/0154395 | A1* | 5/2023 | Mcnelley | G06T 19/006 345/76 |
| 2023/0308610 | A1* | 9/2023 | Henderson | G06F 3/011 |

OTHER PUBLICATIONS

Godard, Clément, Oisin Mac Aodha, and Gabriel J. Brostow. "Unsupervised monocular depth estimation with left-right consistency." In Proceedings of the IEEE Conference on Computer Vision and Pattern Recognition, pp. 270-279. 2017.

Roy, Anirban, and Sinisa Todorovic. "Monocular depth estimation using neural regression forest." In Proceedings of the IEEE Conference on Computer Vision and Pattern Recognition, pp. 5506-5514. 2016.

Fu, Huan, Mingming Gong, Chaohui Wang, Kayhan Batmanghelich, and Dacheng Tao. "Deep ordinal regression network for monocular depth estimation." In Proceedings of the IEEE Conference on Computer Vision and Pattern Recognition, pp. 2002-2011. 2018.

Godard, Clément, Oisin Mac Aodha, Michael Firman, and Gabriel J. Brostow. "Digging into self-supervised monocular depth estimation." In Proceedings of the IEEE International Conference on Computer Vision, pp. 3828-3838. 2019.

Shah, Shishir, and J. K. Aggarwal. "Depth estimation using stereo fish-eye lenses." In Proceedings of 1st International Conference on Image Processing, vol. 2, pp. 740-744. IEEE, 1994.

Geiger, Andreas, Julius Ziegler, and Christoph Stiller. "Stereoscan: Dense 3d reconstruction in real-time." In 2011 IEEE Intelligent Vehicles Symposium (IV), pp. 963-968. Ieee, 2011.

Liu, Chen, Kihwan Kim, Jinwei Gu, Yasutaka Furukawa, and Jan Kautz. "Planercnn: 3d plane detection and reconstruction from a single image." In Proceedings of the IEEE Conference on Computer Vision and Pattern Recognition, pp. 4450-4459. 2019.

* cited by examiner

TECHNIQUES FOR POSITIONING SPEAKERS WITHIN A VENUE

BACKGROUND

Technical Field

Embodiments of the present disclosure relate generally to sound engineering and, more specifically, to techniques for positioning speakers within a venue.

Description of the Related Art

In preparation for concerts and other events at venues such as arenas, theaters, etc., speakers are oftentimes installed to amplify the sounds produced on a stage. Sound engineers typically determine a number and the placement of speakers within a venue so as to produce an optimal sound experience for each member of the audience. One commonly used type of speaker system is a line array that includes a number of speaker elements mounted in a line and fed in phase.

Conventional sound engineering software allows a sound engineer to input the dimensions of audience seating areas, angles of curvature, and other measurements associated with a venue. Given such measurements, the sound engineering software generates a two-dimensional (2D) planar representation of the venue. The sound engineer can then add a number of virtual speakers to the 2D planar representation and adjust various parameters associated with the speakers, such as a number and placement of the speakers, to identify a configuration of speakers that produces a desired sound pressure level over a range of audible frequencies across the audience seating areas. As used herein, the sound pressure level is a local pressure deviation from the ambient air pressure caused by a sound wave. For example, in the case of a line array of speakers, the sound engineer could adjust a number of speakers included in the line array, an angle, a curvature, and other parameters associated with the line array to identify a configuration of speakers that produces the desired sound pressure level across the audience seating areas.

One drawback of the above approach for determining the number and placement of speakers within a venue is that conventional sound engineering software does not incorporate functionality to generate a 2D planar representation or a three-dimensional (3D) model of a venue without physical measurements of the venue. Such physical measurements can only be obtained from blueprints of the venue and/or by traveling to the venue and making measurements, which is typically quite time consuming.

In addition, conventional sound engineering software does not incorporate functionality to automatically analyze and place speakers within a venue. Instead, conventional sound engineering software provides a framework that requires a sound engineer to apply a tedious trial and error approach in which the sound engineer inputs a speaker configuration and analyzes the effectiveness of the speaker configuration. For example, a sound engineer can manually adjust various parameters associated with the speakers in a line array, such as a number of speakers in the line array of speakers and an angle, a curvature, etc. of the line array, until the line array of speakers produces a desired sound pressure level over a range of frequencies across audience seating areas of a venue.

As the foregoing illustrates, what is needed in the art are more effective techniques for positioning speakers within venues.

SUMMARY

One embodiment of the present application sets forth a computer-implemented method for positioning one or more speakers. The method includes generating, via a machine learning model, at least one of a two-dimensional (2D) representation or a three-dimensional (3D) representation of a venue based on one or more images of the venue. The method further includes determining one or more parameters associated with one or more speakers to be placed within the venue based on the at least one of the 2D representation or the 3D representation.

Other embodiments of the present disclosure include, without limitation, a computer-readable medium including instructions for performing one or more aspects of the disclosed techniques as well as a computing device for performing one or more aspects of the disclosed techniques.

At least one technical advantage of the disclosed techniques relative to the prior art is that a sound engineering application is able to generate a 2D planar representation and/or a 3D model of a venue, without requiring physical measurements of the venue. In addition, the sound engineering application automatically applies regression or machine learning models, which do not require manual trial and error, to optimize parameters associated with speakers that are to be placed in the venue. These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
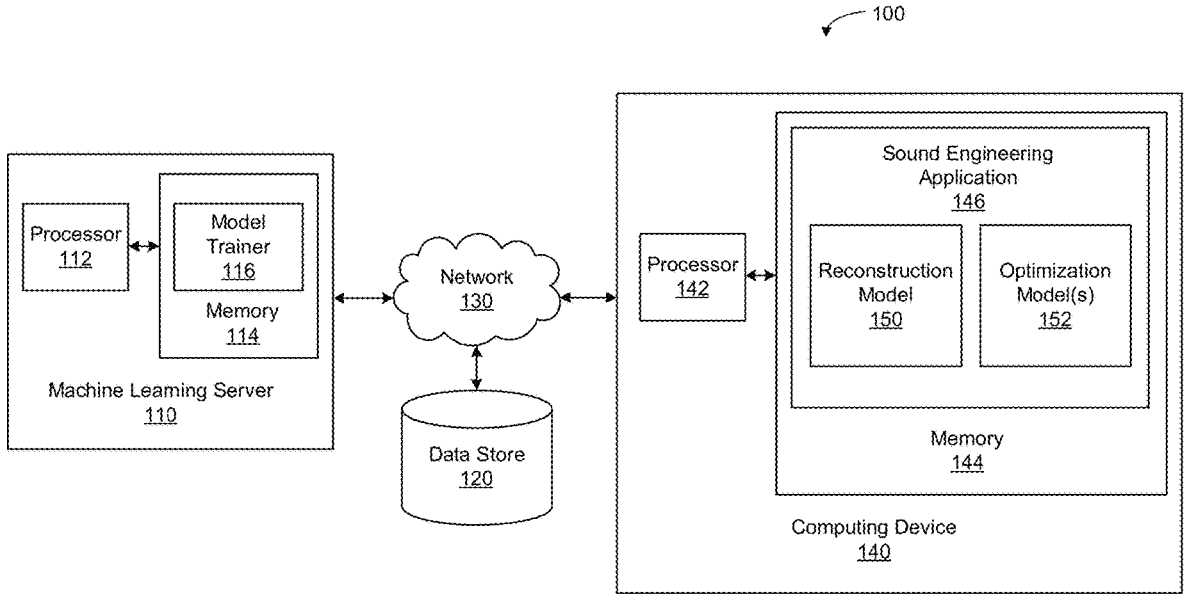
FIG. 1 illustrates a system configured to implement one or more aspects of the various embodiments.

FIG. 1 illustrates a system 100 configured to implement one or more aspects of the various embodiments. As shown, the system 100 includes a machine learning server 110, a data store 120, and a computing device 140 in communication over a network 130, which may be a wide area network (WAN) such as the Internet, a local area network (LAN), or any other suitable network.

As shown, a model trainer 116 executes on a processor 112 of the machine learning server 110 and is stored in a memory 114 of the machine learning server 110. The processor 112 receives user input from input devices, such as a keyboard or a mouse. In operation, the processor 112 is the master processor of the machine learning server 110, controlling and coordinating operations of other system components. In particular, the processor 112 may issue commands that control the operation of a graphics processing unit (GPU) that incorporates circuitry optimized for graphics and video processing, including, for example, video output circuitry. The GPU may deliver pixels to a display device that may be any conventional cathode ray tube, liquid crystal display, light-emitting diode display, or the like.

A system memory 114 of the machine learning server 110 stores content, such as software applications and data, for use by the processor 112 and the GPU. The system memory 114 may be any type of memory capable of storing data and software applications, such as a random access memory (RANI), a read-only memory (ROM), an erasable programmable read-only memory (EPROM or Flash ROM), or any suitable combination of the foregoing. In some embodiments, a storage (not shown) may supplement or replace the system memory 114. The storage may include any number and type of external memories that are accessible to the PROCESSOR 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of CPUs, the number of GPUs, the number of system memories 114, and the number of applications included in the system memory 114 may be modified as desired. Further, the connection topology between the various units in FIG. 1 may be modified as desired. In some embodiments, any combination of the PROCESSOR 112, the system memory 114, and a GPU may be replaced with any type of virtual computing system, distributed computing system, or cloud computing environment, such as a public or a hybrid cloud.

The model trainer 116 is configured to train machine learning models and/or generate regression models. In some embodiments, the model trainer 116 trains a reconstruction model 150 to generate 2D planar representations and/or 3D models of venues given one or more images of those venues. For example, in some embodiments, the reconstruction model 150 may be a convolutional neural network. The reconstruction model 150 can be trained in any technically feasible manner. For example, in some embodiments, the reconstruction model 150 may be trained via a supervised training technique in which expected outputs (2D planar representations and/or 3D models) are included in training data along with corresponding images of venues that are input into the reconstruction model 150. As another example, in some embodiments, the reconstruction model 150 may be trained via an unsupervised training technique in which no ground truth data, such as expected 2D planar representation and/or 3D model outputs, is used. In such cases, the training data can include single images or sets of images of venues that are input into the reconstruction model 150, and the reconstruction model 150 can be trained to estimate depth from the single images or sets of images. As a further example, in some embodiments, the reconstruction model 150 may be trained via an unsupervised training technique to generate a 3D model. In such cases, the 3D model can be further projected to a 2D planar representation. Although ground truth data is not used in unsupervised learning techniques, in some embodiments, additional information such as a length and/or breadth of venues may be included in training data. It should be understood that different architectures of the reconstruction model 150 may be chosen based on the desired inputs and outputs, such as whether the additional information, described above, is input into the reconstruction model 150.

The model trainer 116 further trains, or otherwise generates, one or more optimization models 152 that can be used to optimize one or more parameters associated with speakers to be placed in a venue based on a 2D planar representation and/or a 3D model of the venue and additional user inputs, as described in greater detail below. The parameters can include parameters that are associated with individual speakers and/or parameters that are associated with one or more sets of speakers, such as a line array of speakers. For example, the parameters could include the number of speakers in and the position (e.g., x, y, and z coordinates) of a line array of speakers, as well as the curvature angle and other parameters associated with individual speakers in the line array, etc. In some embodiments, the one or more optimization models 152 may include multiple models that optimize different parameters. For example, in some embodiments, one model may optimize a number of speakers, another model may optimize a position of a line array of speakers, and additional models may optimize other parameters associated with the speakers. In some embodiments, the one or more optimization models 152 may include one or more regression models that can be generated via a supervised regression technique that fits each regression model to corresponding data that is associated with a parameter. In other embodiments, the one or more optimization models 152 may include one or more deep learning models, such as feed forward neural networks that can each be trained by the model trainer 116 using data associated with a corresponding parameter.

Training data and/or trained learning models may be stored in the data store 120. In some embodiments, the data store 120 may include any storage device or devices, such as fixed disc drive(s), flash drive(s), optical storage, network attached storage (NAS), and/or a storage area-network (SAN). Although shown as accessible over the network 130, in some embodiments the machine learning server 110 may include the data store 120.

As shown, a sound engineering application 146 is stored in a memory 144, and executes on a processor 142, of the computing device 140. Components of the computing device 140, including the memory 144 and processor 142 may be similar to corresponding components of the machine learning server 110. The sound engineering application 146 includes the reconstruction model 150 and the one or more optimization models 152. As described in greater detail below, the sound engineering application 146 processes one or more images of a venue using the reconstruction model 150 to generate a 2D planar representation and/or a 3D model of a venue. The sound engineering application 146 further processes the 2D planar representation and/or the 3D model of the venue and additional user input via the one or more optimization models 152, which output optimized values of parameters associated with speakers to be placed in the venue. The parameters can then be displayed to a user via, e.g., a user interface that also permits the user to modify those parameters.

The number of machine learning servers and computing devices may be modified as desired. Further, the functionality included in any of the applications may be divided across any number of applications or other software that are stored and execute via any number of devices that are located in any number of physical locations.

Automatically Positioning Speakers within a Venue

Figure 2:
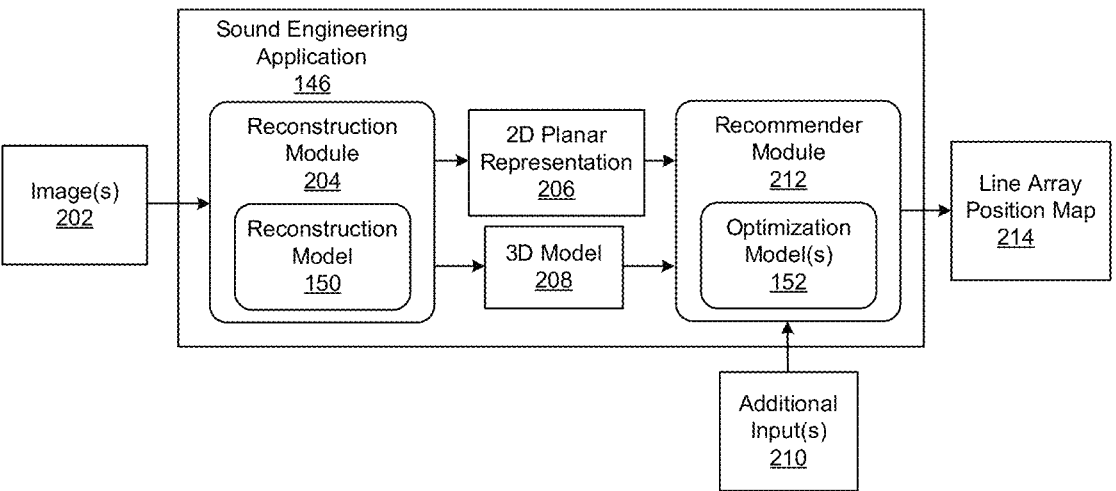
FIG. 2 is a more detailed illustration of the sound engineering application of FIG. 1, according to various embodiments.

FIG. 2 is a more detailed illustration of the sound engineering application 146 of FIG. 1, according to various embodiments. As shown, the sound engineering application 146 receives one or more images 202 of a venue as inputs. The one or more images 202 can include a single wide-angle image of the venue or a set of images of the venue, such as a stereo pair of images or a set of images that can be combined to create a panoramic view of the venue. The one or more images 202 can be captured in any technically feasible manner (e.g., using a digital camera). In some embodiments, the one or more images 202 are captured from a stage in the venue and depict areas where an audience can be seated. Although audience seating areas are used herein as a reference example, techniques disclosed herein are also applicable to areas where an audience can stand. In some embodiments, the one or more images 202 can also depict a stage, including cross bars of the stage. Speakers, such as a line array of speakers, can be suspended from the cross bars of a stage or from the ceiling of a venue. Alternatively, speakers, such as a line array, can be placed on the ground, such as on the stage and/or on a platform near the stage. Although line arrays of speakers are described herein as a reference example, embodiments may also be used to place other types of speakers within a venue.

As shown, a reconstruction module 204 processes the one or more images 202 using the reconstruction model 150 to generate a 2D planar representation 206 of the venue and a 3D model 208 of the venue. In some embodiments, the reconstruction module 204 may be a plugin to the sound engineering application 146 that, when activated, can be used to generate the 2D planar representation 206 and the 3D model 208. Although a reconstruction module 204 that generates a 2D planar representation and a 3D model is shown for illustrative purposes, in other embodiments, the reconstruction module 204 may generate only a 2D planar representation or only a 3D model.

Figure 3:
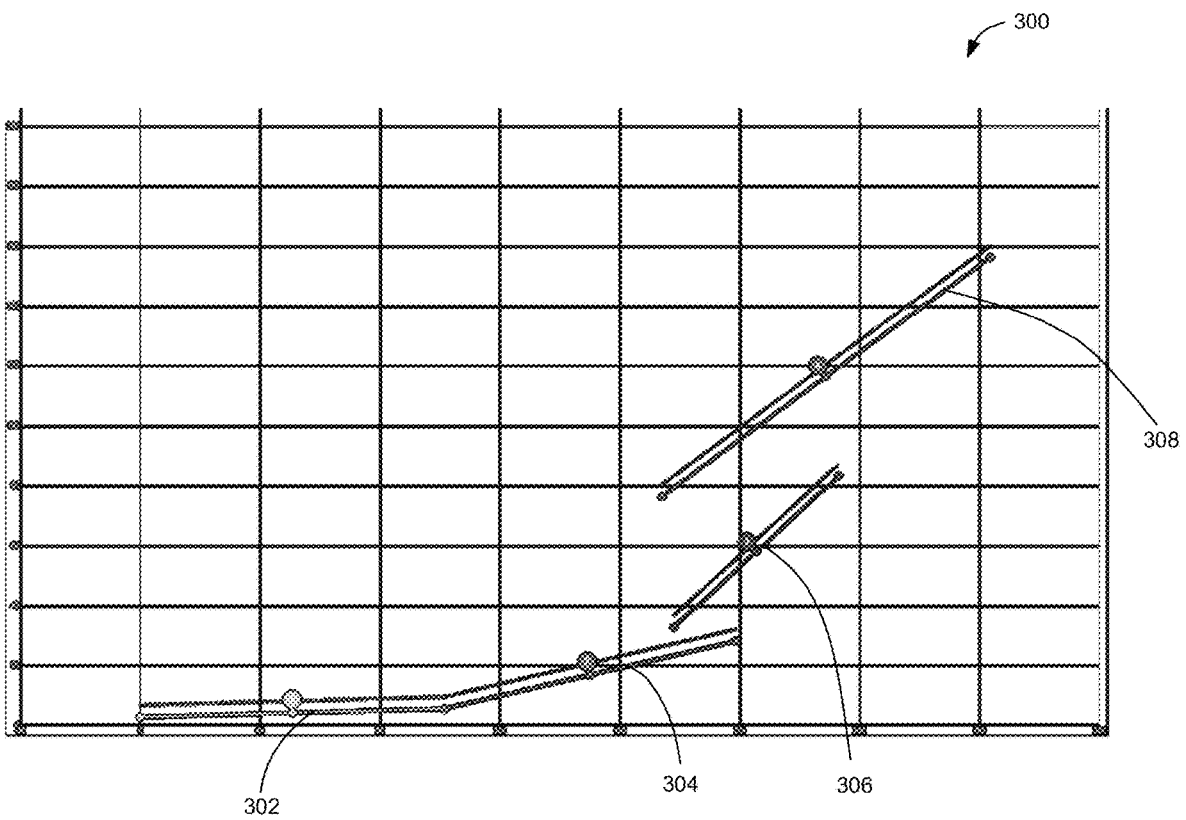
FIG. 3 illustrates an exemplary planar map of a venue, according to various embodiments.

FIG. 3 illustrates an exemplary 2D planar map 300 of a venue generated by the reconstruction module 204, according to various embodiments. As shown, the 2D planar map 300 includes lines 302-308 representing audience seating areas. Oftentimes, audience seating areas in a venue, such as the areas represented by the lines 302-308, are divided into tiers having different slopes, and the slopes of upper tiers are typically greater than the slopes of lower tiers. Similarly, a 3D model of a venue can include representations of audience seating areas. In addition, the 3D model can represent the general layout of a venue, such as the curvature of rows of seats in an audience seating area. In some embodiments, the 3D model can also be projected into 2D to generate various 2D planar representations, each of which may correspond to a 2D profile of the venue radiating outward from a stage of the venue at a corresponding angle. Although 2D planar representations and 3D models that include representations of audience seating areas are described herein as a reference example, in some embodiments, a 2D planar representation and/or 3D model may include other information. For example, the 2D planar representation and/or 3D model could include representations of balconies or other structures that sound cannot pass through.

Returning to FIG. 2, in some embodiments, the reconstruction model 150 is a convolutional neural network. As described, the reconstruction model 150 can be trained in any technically feasible manner, such as via a supervised training technique or an unsupervised training technique. In some embodiments, the reconstruction model 150 is trained to take as input a single wide-angle image of a venue or a set of images of a venue and to output the 2D planar representation 206 and the 3D model 208. Although both a 2D planar representation and a 3D model are shown for illustrative purposes, in other embodiments, the reconstruction model may be trained to only output a 2D planar representation or only a 3D model, or the reconstruction model may be trained to output other information, such as the depth of each pixel in a wide-angle image, that can be used to generate a 2D planar representation and/or a 3D model by, e.g., inputting the depth information into a mapping or drawing application. In embodiments in which the reconstruction model outputs a 3D model, the reconstruction module 204 can also project the 3D model into 2D to generate a 2D planar representation of a venue.

As shown, a recommender module 212 generates a line array position map 214 based on the 2D planar representation 206, the 3D model 208, and one or more additional inputs 210. Similar to the reconstruction module 204, in some embodiments, the recommender module 212 may be a plugin to the sound engineering application 146 that, when activated, can generate the line array position map 214. The additional inputs 210 to the recommender module 212 can be entered by a user, such as via a user interface provided by the sound engineering application 146, and/or imported from another source, in any technically feasible manner. In some embodiments, the additional inputs include one or more of measurements of the venue and/or a blueprint of the venue, an average audience height, a type of the speakers, whether the speakers are grounded or suspended, a temperature, a humidity, a cable weight, a top frame type, a suspension mode if the speakers are suspended, suspension points if the speakers are suspended, whether an extension bar or pull back frame is used, and/or a budget. For example, measurements of the venue and/or a blueprint of the venue and a known size of the 2D planar representation and/or 3D model can be used to determine a scale factor relating the size of the 2D planar representation and/or 3D model to a real-world size of the venue, and the recommender module 212 can use the scale factor to make calculations for parameters associated with a line array of speakers. As another example, the average heights of audiences can vary across demographics, which needs to be accounted for when determining the sound pressure level at a head line of an audience. As yet another example, the temperature and humidity in a venue can affect how sound travels and, therefore, the sound pressure level. As further examples, different types of line arrays of speakers can have different suspension points, and different types of cables used in line arrays can have different tensile strengths/cable weights.

Illustratively, the recommender module 212 inputs the 2D planar representation 206, the 3D model 208, and one or more additional inputs 210 into one or more optimization models 152 to generate the line array position map 214. The line array position map 214 may indicate an optimized position and curvature of a line array of speakers, as well as other mechanical parameters associated with the speakers, that permit audience members at various locations in a venue to experience a relatively optimal sound pressure level over a range of audible frequencies. In some embodiments, the one or more optimization models 152 that are used to generate the line array position map 214 may include one or more regression models that can be generated by the model trainer 116 via a regression technique. In other embodiments, the one or more optimization models 152 may include one or more deep learning models, such as feed forward neural networks, that are trained by the model trainer 116.

In some embodiments, the one or more optimization models 152 may include multiple models that optimize different parameters associated with speakers. For example, in some embodiments, one model optimizes the number of speakers, another model optimizes the position of a line array of speakers, and additional models optimize other parameters associated with the speakers. In such cases, the recommender module 212 may apply the optimization models 152 sequentially and input the outputs of the previously applied optimization models 152 into subsequent optimization models 152. For example, the recommender module 212 may first apply an optimization model that optimizes the number of speakers, and then input the optimized number of speakers along with the 2D planar representation 206, the 3D model 208, and one or more additional inputs into another optimization model that optimizes the position of a line array of speakers, and so on for other parameters associated with the speakers. In some embodiments, the number of speakers is optimized first, because the position of a line array of speakers and other parameters can depend on the number of speakers.

As described, the one or more additional inputs 210 can, in some embodiments, include an average height of audience members. In such cases, the recommender module 212 can calculate a head line of the audience by adding the average height to the slopes of lines representing audience seating areas in the 2D planar representation 206 and/or to audience seating areas represented in the 3D model 208. The head line, or alternatively an ear line, is used to estimate the sound pressure level at various frequencies that may be experienced by members of an audience. The recommender module 212 can then determine, using the one or more optimization models 152, a number of speakers, the position of a line array of speakers, and/or other parameters associated with the speakers that permit the speakers to produce a relatively uniform sound pressure level over a range of audible frequencies and across multiple virtual microphones placed at a number of sample locations and at the head line within the audience seating areas. A relatively uniform sound pressure level over a range of frequencies can help ensure that the sound experience is not too loud for some audience members and too quiet for others. In addition to optimizing the number of speakers, the position of a line array of speakers, and/or other parameters based on the sound pressure level over the range of frequencies at the virtual microphones within the audience seating areas, the recommender module 212 can optimize one or more parameters based on the center of gravity of a line array of speakers. For example, the recommender module 212 could optimize a bottom frame/base plate of the line array, attachment points of the line array, curvature angle of each speaker, etc. to ensure that a center of gravity of a line array of speakers is stable and the speakers do not fall due to an unstable stacking and/or curvature angles. The center of gravity of the line array of speakers can be computed in any technically feasible manner, including using known techniques.

In some embodiments, the one or more optimization models 152 include one or more regression models or deep learning models that output parameters including the number of speakers, the position of a line array speakers, etc. that are associated with (1) relatively similar sound pressure levels over a range of frequencies across virtual microphones at various locations within audience seating areas, and (2) relatively similar weights exerted across suspension points or base frame points in a line array of speakers, such that a center of gravity of the line array of speakers is stable. In some embodiments, an optimization with respect to sound pressure level is performed prior to an optimization with respect to the center of gravity of a line array of speakers.

More generally, the recommender module 212 may solve a constrained optimization problem to optimize (1) and (2) subject to constraints on a maximum number of speakers (and/or subwoofers) that can be combined, weights exerted on suspension points in the line array of speakers, stability of the center of gravity of the line array, a similarity of sound pressure levels over a range of frequencies at virtual microphones placed at various locations within audience seating areas, and a frequency response of sound received at virtual microphones being within a normal hearing range (indicating that optimal sound is being received at the virtual microphones). The constrained optimization problem can be solved in any technically feasible manner, including using the regression models and feed forward neural networks described above. As another example, a single deep learning model could be used that generates multi-scale outputs. In such a case, the deep learning model can include multiple branches that each output a different parameter.

Figure 4:
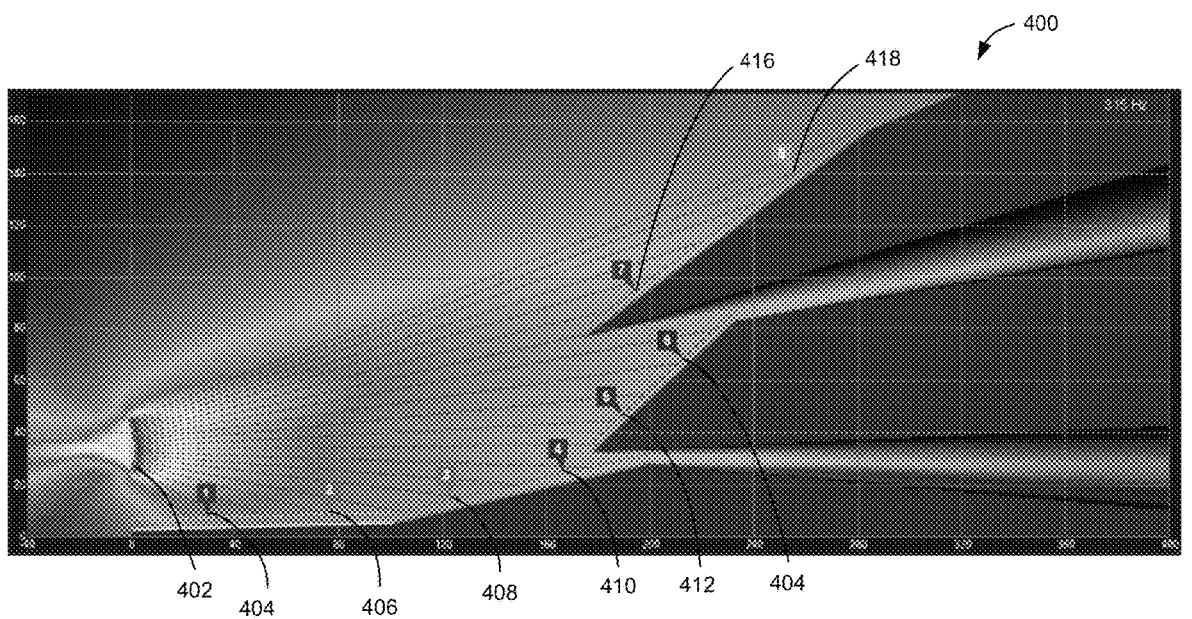
FIG. 4 illustrates an exemplary sound pressure level map for the venue of FIG. 3, according to various embodiments.

FIG. 4 illustrates an exemplary sound pressure level map 400 for the venue of FIG. 3, according to various embodiments. As shown, the recommender module 212 determines, using the one or more optimization models 152, a number of speakers and the position of a line array of speakers 402 suspended from a stage. In some embodiments, the one or more optimization models 152 are applied to optimize the number and position of the line array of speakers 402, among other things, such that sound pressure levels at a number of virtual microphones 404-418 placed at the head line of an audience to measure frequency responses are within a predefined range of sound pressure levels. In addition, in some embodiments, sound pressure levels can be determined, and the number of speakers, position of the line array, etc. can be optimized, for a range of audible frequencies. The predefined range of sound pressures and the range of frequencies can be chosen to ensure that all audience members experience a relatively uniform and desirable sound pressure level over the range of frequencies.

In addition to determining the number of speakers and the position of the line array of speakers 402 based on the sound pressure levels shown in FIG. 4, the recommender module 212 can use one or more of the optimization models 152 to determine other parameters associated with the speakers, such as a bottom frame angle in the line array of speakers 402 (or a base plate angle in the case of speakers mounted on a base plate), a curvature angle of each speaker, attachment points of the line array of speakers 402, a pull back frame, an extension bar location, and/or an estimated cost of the speakers. As described above, the parameters determined by the recommender module 212 can include parameters that are associated with individual speakers and/or parameters that are associated with one or more sets of speakers, such as the speakers in a line array. As described, such parameters can be optimized to ensure that relatively similar weights are exerted across suspension points or base frame points in a line array of speakers, such that a center of gravity of the line array of speakers is stable and the speakers do not fall due to an unstable stacking and/or curvature angle. In some embodiments, a cost may be input as a budget into the recommender module 212 as additional input rather than output as an estimation by the recommender module 212. As described in greater detail below in conjunction with FIGS. 6-7, in some embodiments, a stable center of gravity for a line array of speakers can include a center of gravity that is between suspension points in the case of a suspended line array, or over a base plate in the case of a ground stacked line array.

Returning to FIG. 2, the recommender module 212 outputs a line array position map 214 indicating the number of speakers in a line array and where the line array should be positioned within a venue, among other things. In some embodiments, the recommender module 212 may display the line array position map 214 to a user via, for example, a user interface. In such cases, the user interface may also permit the user to modify one or more parameters associated with the speakers, such as the number of speakers, the position of a line array of speakers, etc.

Figure 5:
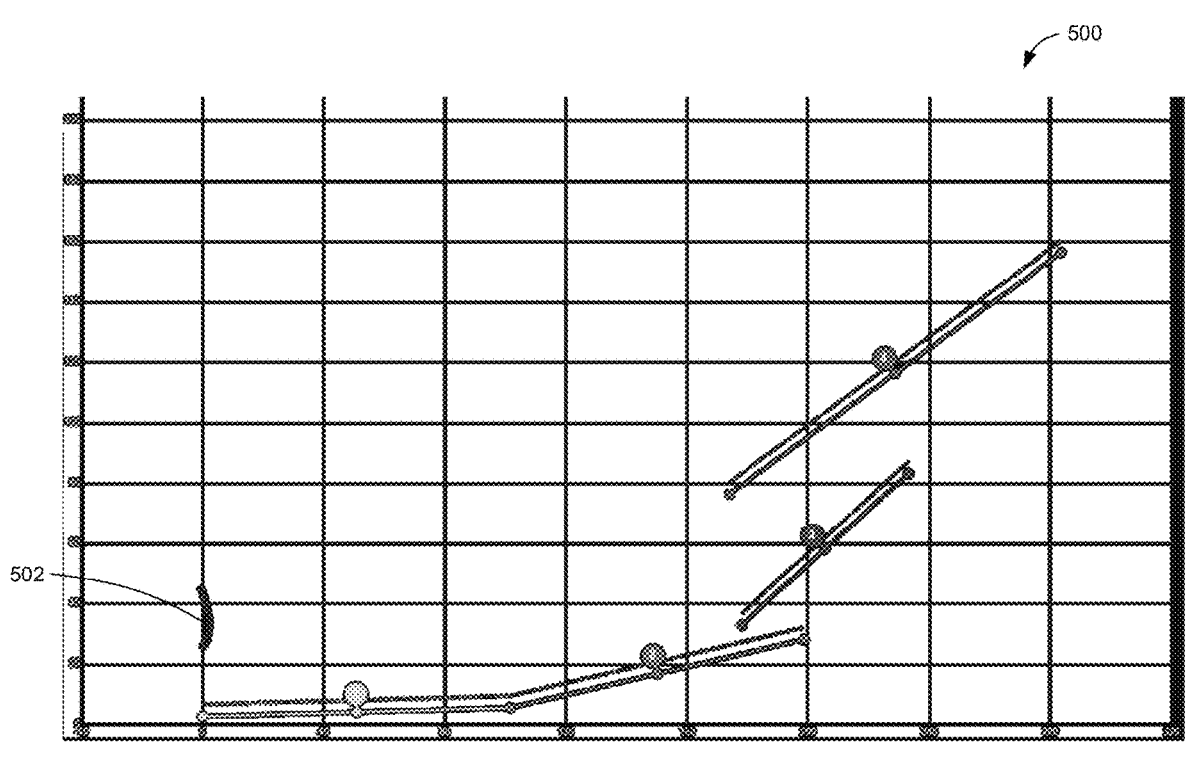
FIG. 5 illustrates an exemplary line array position map for the venue of FIG. 3, according to various embodiments.

FIG. 5 illustrates an exemplary line array position map 500 for the venue of FIG. 3, according to various embodiments. As shown, the line array position map 500 indicates the position of a line array of speakers 502 within the venue, as well as curvature and a number of speakers in the line array of speakers 502. As described, a number of speakers, position, and other parameters associated with a line array of speakers may be optimized by the recommender module 212 so as to ensure that the sound pressure level at a number of virtual microphones and over a range of frequencies are within a predefined range of sound pressure levels and a center of gravity of the line array of speakers is stable.

Figure 6:
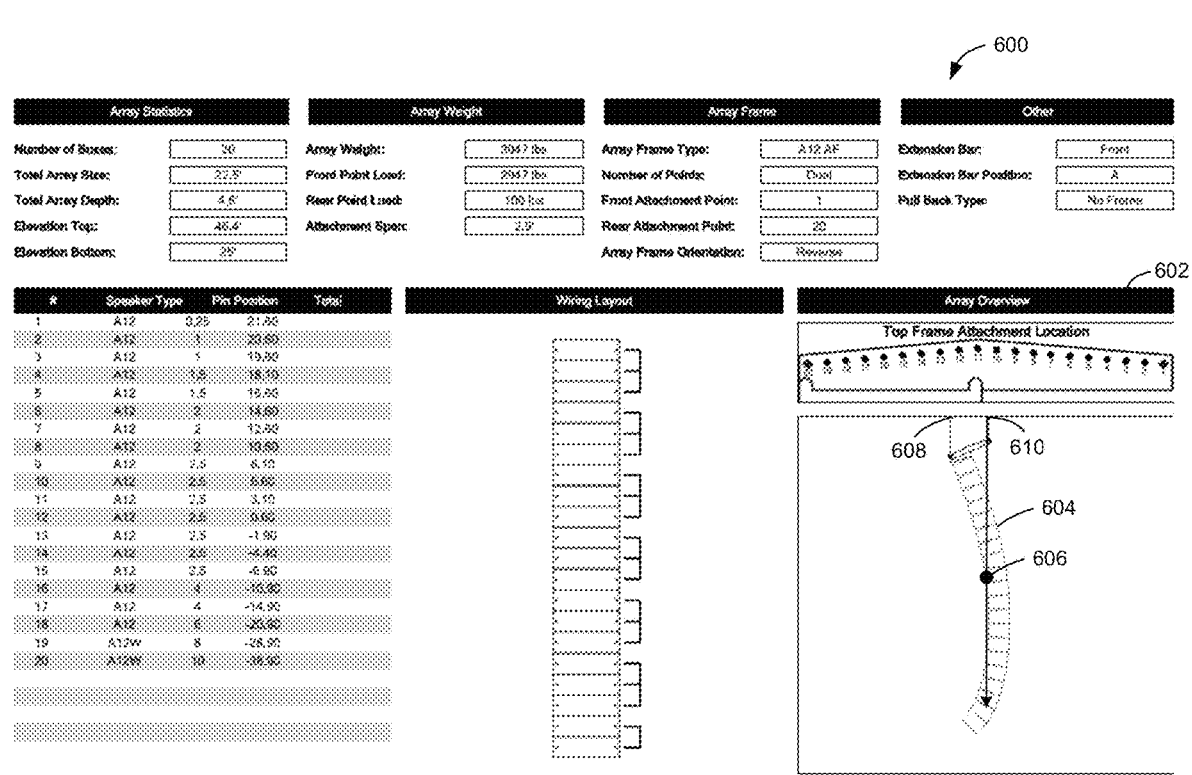
FIG. 6 illustrates exemplary parameters for a suspended array of speakers, according to various embodiments.

In addition to outputting the line array position map 214, the recommender module 212 can also output various parameters associated with the speakers that are determined using the one or more optimization models 152. FIG. 6 illustrates exemplary parameters for a suspended array of speakers, according to various embodiments. As shown, the parameters include the pin positions of speakers of two types within a line array of speakers, as well as parameters associated with array statistics, array weight, array frame, and other parameters. In some embodiments, the sound engineering application 146 may display the parameters to a user via a user interface, such as user interface 600. In such cases, the user interface may also permit the user to modify the parameters. Accordingly, the user can adjust automatically determined parameter values by, for example, entering different values via the user interface 600.

Illustratively, the user interface 600 also includes an array overview 602 section that shows the configuration of a line array of speakers 604 associated with the parameters, as well as a center of gravity 606 of the line array of speakers 604. As shown, the center of gravity 606 is between suspension points 608 and 610 from which the line array of speakers 604 is suspend, which as described above can be a stable configuration.

Figure 7:
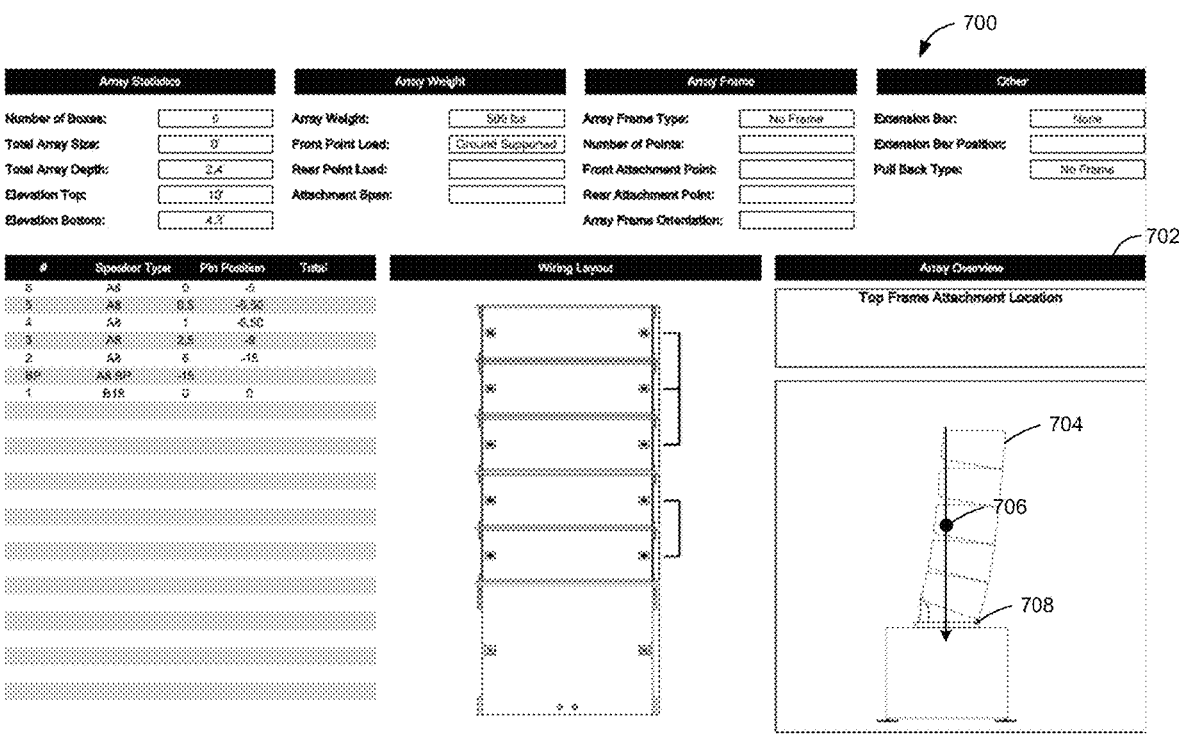
FIG. 7 illustrates exemplary parameters for a ground stacked array of speakers, according to various embodiments.

FIG. 7 illustrates exemplary parameters for a ground stacked array of speakers, according to various embodiments. Similar to the parameters described above in conjunction with FIG. 6, the parameters for the ground stacked array of speakers include the pin positions of speakers of three types in a line array of speakers, as well as parameters associated with array statistics, array weight, array frame, and other parameters. In addition, in some embodiments, the sound engineering application 146 may display the parameters to a user via a user interface, such as user interface 700, that permits the user to modify the parameters. Similar to the user interface 600, the user interface 700 also includes an array overview 702 section that shows the configuration of a grounded stacked line array of speakers 704 associated with the parameters, as well as a center of gravity 706 of the line array of speakers 704. As shown, the center of gravity 706 is over a base plate 708 on which the line array of speakers 704 is mounted, which as described above can be a stable configuration.

Figure 8:
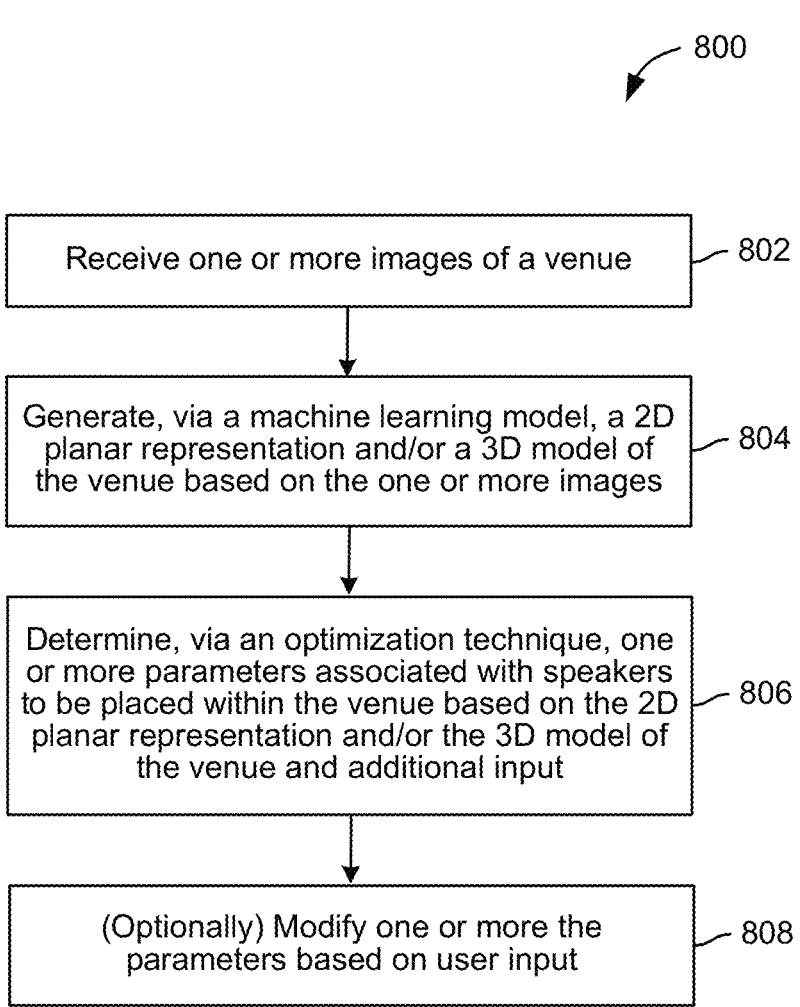
FIG. 8 sets forth a flow diagram of method steps for positioning speakers within a venue, according to various embodiments.

FIG. 8 sets forth a flow diagram of method steps for positioning speakers within a venue, according to various embodiments. Although the method steps are described in conjunction with the system of FIGS. 1-2, persons of ordinary skill in the art will understand that any system configured to perform the method steps, in any order, is within the scope of the present disclosure.

As shown, a method 800 begins at step 802, where the sound engineering application 146 receives one or more images of a venue. As described, in some embodiments, the sound engineering application 146 receives a single, wide-angle image that is taken from a stage in a venue. In other embodiments, the sound engineering application 146 may receive a set of images taken from the stage that can be combined into a wide-angle image, or that are not combined, by the sound engineering application 146. For example, the set of images could include a stereo pair of images or a set of images that the sound engineering application 146 combines to create a panoramic view of the venue.

At step 804, the sound engineering application 146 generates, via a machine learning model, a 2D planar representation and/or a 3D model of the venue based on the one or more images received at step 802. As described, in some embodiments, the machine learning model may be a convolutional neural network that takes the one or more images as inputs and outputs the 2D planar representation and/or the 3D model. In other embodiments, the machine learning model may output depth information, such as the depth of each pixel in a wide-angle image, that can be used to generate a 2D planar representation and/or a 3D model, by, e.g., inputting the depth information into a mapping or drawing application.

At step 806, the sound engineering application 146 determines, via an optimization technique, one or more parameters associated with speakers to be placed within the venue based on the 2D planar representation and/or the 3D model of the venue and additional inputs. As described, in some embodiments, the additional inputs can include one or more of measurements of the venue and/or a blueprint of the venue that can be used to determine a scale factor, an average audience height, a type of the speakers, whether the speakers are grounded or suspended, a temperature, a humidity, a cable weight, a top frame type, a suspension mode if the speakers are suspended, suspension points if the speakers are suspended, whether an extension bar or pull back frame is used, and/or a budget. In addition, the one or more parameters that are optimized can include a number of speakers and a position of a line array of speakers, a bottom frame angle or a base plate angle in a line array of speakers, a curvature angle of each speaker in the line array, attachment points of the line array, a pull back frame, an extension bar location and position, an estimated cost, etc. In some embodiments, regression models or deep learning models can be employed to sequentially optimize the number of speakers, the position of a line array of speakers, and other parameters associated with the speakers based on the sound pressure level over a range of frequencies at virtual microphones within audience seating areas, and further based on the center of gravity of a line array of speakers, as described above in conjunction with FIGS. 2 and 4-7.

At step 806, the sound engineering application 146 optionally modifies one or more of the parameters determined at step 804 based on user input. As described, in some embodiments, the sound engineering application 146 can display the one or more parameters that are determined via optimization to a user via a user interface. In such cases, the user interface may also permit the user to modify the displayed values of the one or more parameter values to other values.

Although described herein primarily with respect to a sound engineering application that generates a 2D representation and/or 3D model based on one or more images and determines one or more parameters associated with speakers to be placed within a venue, in other embodiments the generating of the 2D representation and/or the 3D model, or the determining of the one or more parameters, may be performed manually by a user. For example, in some embodiments, the sound engineering application may only generate a 2D representation and/or 3D model of a venue, after which a user can manually configure parameters associated with speakers to be placed within the venue so as to produce a desired sound pressure level over a range of frequencies within audience seating areas. As another example, in some embodiments, a 2D representation and/or 3D model that is created manually may be analyzed using the sound engineering application to determine parameters associated with speakers to be placed within a venue.

In sum, techniques are disclosed for positioning speakers within a venue. A sound engineering application processes one or more images of a venue using a deep learning model to generate a 2D planar representation and/or a 3D model of the venue. The sound engineering application then processes the 2D planar representation and/or the 3D model and additional relevant inputs using one or more optimization models to determine one or more parameters associated with speakers to be placed in the venue, such as a number of speakers, the position a line array of speakers, etc. In some embodiments, the optimization models are regression or deep learning models that optimize different parameters and are applied sequentially. In addition, the one or more parameters may be output to a user via a user interface, and the user interface may also permit the user to modify the one or more parameters.

At least one technical advantage of the disclosed techniques relative to the prior art is that a sound engineering application is able to generate a 2D planar representation and/or a 3D model of a venue, without requiring physical measurements of the venue. In addition, the sound engineering application automatically applies regression or machine learning models, which do not require manual trial and error, to optimize parameters associated with speakers that are to be placed in the venue. These technical advantages represent one or more technological improvements over prior art approaches.

Any and all combinations of any of the claim elements recited in any of the claims and/or any elements described in this application, in any fashion, fall within the contemplated scope of the present invention and protection.

1. In some embodiments, a computer-implemented method for positioning one or more speakers within a venue comprises generating, via a machine learning model, at least one of a two-dimensional (2D) representation or a three-dimensional (3D) representation of a venue based on one or more images of the venue, and determining one or more parameters associated with one or more speakers to be placed within the venue based on the at least one of the 2D representation or the 3D representation.

2. The computer-implemented method of clause 1, wherein determining the one or more parameters comprises processing the at least one of the 2D representation or the 3D representation and one or more additional inputs via a plurality of models that optimize different parameters.

3. The computer-implemented method of clauses 1 or 2, wherein each model included in the plurality of models comprises one of a regression model or a deep learning model.

4. The computer-implemented method of any of clauses 1-3, wherein determining the one or more parameters comprises optimizing the one or more parameters with respect to sound pressure levels over a range of frequencies and a center of gravity associated with a line array that includes the one or more speakers.

5. The computer-implemented method of any of clauses 1-4, wherein the one or more additional inputs comprise at least one of one or more measurements of the venue, a blueprint of the venue, an average audience height, a type of the one or more speakers, whether the one or more speakers are grounded or suspended, a temperature, a humidity, a cable weight, a top frame type, a suspension mode, suspension points, whether an extension bar or pull back frame is used, or a budget.

6. The computer-implemented method of any of clauses 1-5, wherein the one or more speakers are included in at least one of a suspended line array or a line array placed on a platform.

7. The computer-implemented method of any of clauses 1-6, wherein the one or more images are images of the venue from a position on a stage of the venue.

8. The computer-implemented method of any of clauses 1-7, wherein the one or more parameters include at least one of a number of the one or more speakers, a position of a line array that includes the one or more speakers, a bottom frame angle or a base plate angle of a line array that includes the one or more speakers, a curvature of each speaker included in the one or more speakers in the line array, attachment points, a pull back frame, an extension bar location, an extension bar position, or an estimated cost.

9. The computer-implemented method of any of clauses 1-8, further comprising modifying at least one of the one or more parameters based on user input.

10. In some embodiments, one or more non-transitory computer-readable storage media include instructions that, when executed by one or more processing units, cause the one or more processing units to position one or more speakers within a venue, by performing the steps of generating, via a machine learning model, at least one of a two-dimensional (2D) representation or a three-dimensional (3D) representation of a venue based on one or more images of the venue, and determining one or more parameters associated with one or more speakers to be placed within the venue based on the at least one of the 2D representation or the 3D representation.

11. The one or more non-transitory computer-readable storage media of clause 10, wherein determining the one or more parameters comprises processing the at least one of the 2D representation or the 3D representation and one or more additional inputs via a plurality of models that optimize different parameters.

12. The one or more non-transitory computer-readable storage media of clauses 10 or 11, wherein each model included in the plurality of models comprises one of a regression model or a deep learning model.

13. The one or more non-transitory computer-readable storage media of any of clauses 10-12, wherein determining the one or more parameters comprises optimizing the one or more parameters with respect to sound pressure levels over a range of frequencies and a center of gravity associated with a line array that includes the one or more speakers.

14. The one or more non-transitory computer-readable storage media of any of clauses 10-13, wherein determining the one or more parameters comprises optimizing at least a number of the one or more speakers and a position of the one or more speakers prior to optimizing at least one other parameter associated with the one or more speakers.

15. The one or more non-transitory computer-readable storage media of any of clauses 10-14, wherein the at least the number of the one or more speakers is optimized via a first model, the at least one other parameter is optimized via a second model, and at least one output of the first model is input into the second model.

16. The one or more non-transitory computer-readable storage media of any of clauses 10-15, wherein the one or more images comprises a wide-angle image of the venue or a pair of stereo images.

17. The one or more non-transitory computer-readable storage media of any of clauses 10-16, wherein the one or more parameters include at least one of a number of the one or more speakers, a position of a line array that includes the one or more speakers, a bottom frame angle or a base plate angle of a line array that includes the one or more speakers, a curvature of each speaker included in the one or more speakers in the line array, attachment points, a pull back frame, an extension bar location, an extension bar position, or an estimated cost.

18. The one or more non-transitory computer-readable storage media of any of clauses 10-17, wherein the at least one of the 2D representation or the 3D representation indicates one or more slopes associated with one or more seating areas in the venue.

19. In some embodiments, a system comprises one or more memories that include instructions, and one or more processors that are coupled to the one or more memories and, when executing the instructions generate, via a machine learning model, at least one of a two-dimensional (2D) representation or a three-dimensional (3D) representation of a venue based on one or more images of the venue, and determine one or more parameters associated with one or more speakers to be placed within the venue based on the at least one of the 2D representation or the 3D representation.

20. The system of clause 19, wherein determining the one or more parameters comprises processing the at least one of the 2D representation or the 3D representation and one or more additional inputs via a plurality of models that optimize different parameters.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RANI), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for positioning one or more physical speakers within a venue, the method comprising:

generating, via a machine learning model, at least one of a two-dimensional (2D) representation or a three-dimensional (3D) representation of a venue based on one or more images of the venue captured from a position on a stage in the venue showing one or more audience seating areas of the venue, the 2D representation or the 3D representation comprising a plurality of lines associated with a plurality of slopes, the plurality of lines representing the one or more audience seating areas of the venue;

determining, via at least one computing device, a head line based on the plurality of lines, the plurality of slopes, and an average height parameter associated with members of an audience; and determining, via one or more models, one or more parameters for placing one or more physical speakers within the venue based on the head line and at least one of the 2D representation or the 3D representation.

2. The computer-implemented method of claim 1, wherein determining the one or more parameters comprises processing the at least one of the 2D representation or the 3D representation and one or more additional inputs via a plurality of models that optimize different parameters.

3. The computer-implemented method of claim 2, wherein each model included in the plurality of models comprises one of a regression model or a deep learning model.

4. The computer-implemented method of claim 1, wherein determining the one or more parameters comprises optimizing the one or more parameters with respect to sound pressure levels over a range of frequencies and a center of gravity associated with a line array that includes the one or more physical speakers.

5. The computer-implemented method of claim 2, wherein the one or more additional inputs comprise at least one of one or more measurements of the venue, a blueprint of the venue, a type of the one or more physical speakers, whether the one or more physical speakers are grounded or suspended, a temperature, a humidity, a cable weight, a top frame type, a suspension mode, suspension points, whether an extension bar or pull back frame is used, or a budget.

6. The computer-implemented method of claim 1, wherein the one or more physical speakers are included in at least one of a suspended line array or a line array placed on a platform.

7. The computer-implemented method of claim 1, wherein the one or more images are images of the venue from a position on a stage of the venue.

8. The computer-implemented method of claim 1, wherein the one or more parameters include at least one of a number of the one or more physical speakers, a position of a line array that includes the one or more physical speakers, a bottom frame angle or a base plate angle of a line array that includes the one or more physical speakers, a curvature of each physical speaker included in the one or more physical speakers in the line array, attachment points, a pull back frame, an extension bar location, an extension bar position, or an estimated cost.

9. The computer-implemented method of claim 1, further comprising modifying at least one of the one or more parameters based on user input.

10. One or more non-transitory computer-readable storage media including instructions that, when executed by one or more processing units, cause the one or more processing units to position one or more physical speakers within a venue, by performing the steps of:

generating, via a machine learning model, at least one of a two-dimensional (2D) representation or a three-dimensional (3D) representation of a venue based on one or more images of the venue captured from a position on a stage in the venue showing one or more audience seating areas of the venue, the 2D representation or the 3D representation comprising a plurality of lines associated with a plurality of slopes, the plurality of lines representing the one or more audience seating areas of the venue;

determining, via at least one computing device, a head line based on the plurality of lines, the plurality of slopes, and an average height parameter associated with members of an audience; and determining, via one or more models, one or more parameters for placing one or more physical speakers within the venue based on the head line and at least one of the 2D representation or the 3D representation.

11. The one or more non-transitory computer-readable storage media of claim 10, wherein determining the one or more parameters comprises processing the at least one of the 2D representation or the 3D representation and one or more additional inputs via a plurality of models that optimize different parameters.

12. The one or more non-transitory computer-readable storage media of claim 11, wherein each model included in the plurality of models comprises one of a regression model or a deep learning model.

13. The one or more non-transitory computer-readable storage media of claim 10, wherein determining the one or more parameters comprises optimizing the one or more parameters with respect to sound pressure levels over a range of frequencies and a center of gravity associated with a line array that includes the one or more physical speakers.

14. The one or more non-transitory computer-readable storage media of claim 10, wherein determining the one or more parameters comprises optimizing at least a number of the one or more physical speakers and a position of the one or more physical speakers prior to optimizing at least one other parameter associated with the one or more physical speakers.

15. The one or more non-transitory computer-readable storage media of claim 14, wherein the at least the number of the one or more physical speakers is optimized via a first model, the at least one other parameter is optimized via a second model, and at least one output of the first model is input into the second model.

16. The one or more non-transitory computer-readable storage media of claim 10, wherein the one or more images comprises a wide-angle image of the venue or a pair of stereo images.

17. The one or more non-transitory computer-readable storage media of claim 10, wherein the one or more parameters include at least one of a number of the one or more physical speakers, a position of a line array that includes the one or more physical speakers, a bottom frame angle or a base plate angle of a line array that includes the one or more physical speakers, a curvature of each physical speaker included in the one or more physical speakers in the line array, attachment points, a pull back frame, an extension bar location, an extension bar position, or an estimated cost.

18. The one or more non-transitory computer-readable storage media of claim 10, wherein the at least one of the 2D representation or the 3D representation indicates one or more slopes associated with one or more seating areas in the venue.

19. A system, comprising:
one or more memories that include instructions; and
one or more processors that are coupled to the one or more memories and, when executing the instructions:
generate, via a machine learning model, at least one of a two-dimensional (2D) representation or a three-dimensional (3D) representation of a venue based on one or more images of the venue captured from a position on a stage in the venue showing one or more audience seating areas of the venue, the 2D representation or the 3D representation comprising a plurality of lines associated with a plurality of slopes, the plurality of lines representing the one or more audience seating areas of the venue;
determine, via at least one computing device, a head line based on the plurality of lines, the plurality of slopes, and an average height parameter associated with members of an audience; and
determine, via one or more models, one or more parameters for placing one or more physical speakers within the venue based on the head line and at least one of the 2D representation or the 3D representation.

20. The system of claim 19, wherein determining the one or more parameters comprises processing the at least one of the 2D representation or the 3D representation and one or more additional inputs via a plurality of models that optimize different parameters.

21. The computer-implemented method of claim 1, wherein determining the one or more parameters comprises optimizing the one or more parameters with respect the average height parameter associated for sound pressure levels over a range of frequencies.

22. The computer-implemented method of claim 1, further comprising adjusting a center of gravity associated with a line array based on the average height parameter.

23. The computer-implemented method of claim 1, wherein generating the head line further comprises adding the average height parameter to each slope from the plurality of slopes.

* * * * *